(12) United States Patent
Borst et al.

(10) Patent No.: US 6,640,104 B1
(45) Date of Patent: Oct. 28, 2003

(54) DYNAMIC CHANNEL ASSIGNMENT FOR INTELLIGENT ANTENNAS

(75) Inventors: Simon C. Borst, Convent Station, NJ (US); Terry Si-Fong Cheng, Randolph, NJ (US); Sudheer A. Grandhi, Lake Hiawatha, NJ (US); Boris Dmitrievich Lubachevsky, Bridgewater, NJ (US); Philip Alfred Whiting, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/473,513

(22) Filed: Dec. 28, 1999

(51) Int. Cl.[7] .............................. H04Q 7/20; H04Q 7/32
(52) U.S. Cl. ................. 455/450; 455/452.1; 455/562.1; 455/422.1; 455/452.2; 455/63.4
(58) Field of Search ............................... 455/422, 450, 455/452, 561, 562, 509, 517, 512, 513, 550, 445, 446, 447, 67.1, 63, 452.1, 63.4, 562.1, 67.11, 63.1, 422.1

(56) References Cited

U.S. PATENT DOCUMENTS

| | | | | |
|---|---|---|---|---|
| 5,590,399 A | * | 12/1996 | Matsumoto et al. | 455/450 |
| 5,603,082 A | * | 2/1997 | Hamabe | 455/450 |
| 5,745,841 A | * | 4/1998 | Reudink et al. | 455/63 |
| 6,052,605 A | * | 4/2000 | Meredith et al. | 455/561 |
| 6,104,930 A | * | 8/2000 | Ward et al. | 455/450 |

FOREIGN PATENT DOCUMENTS

| | | | |
|---|---|---|---|
| EP | 0 941 003 A | 9/1999 | H04Q/7/36 |
| GB | 2 325 818 A | 12/1998 | H04Q/7/34 |
| WO | WO 98/42150 | 9/1998 | H04Q/7/00 |

OTHER PUBLICATIONS

European Search Report dated Dec. 17, 2001.

* cited by examiner

*Primary Examiner*—William Trost
*Assistant Examiner*—Keith Ferguson
(74) *Attorney, Agent, or Firm*—Jimmy Goo

(57) ABSTRACT

Disclosed is a method for improving call quality and capacity by integrating a dynamic channel allocation technique into an intelligent antenna system. The intelligent antenna systems includes beams which are grouped into sets, wherein each set has associated a long list and a primary short list, and each beam has associated a secondary short list. In one embodiment, long term interference levels are measured on each beam in a set of beams for a plurality of communication channels to produce the long list; short term interference levels are measured on each beam in the set of beams for a portion of the plurality of communication channels to produce a plurality of secondary short lists and the primary short list; and communication channels are assigned to a mobile-station from the portion of the plurality of communication channels based on the measured short term interference levels on each beam in the set of beams. The long list and the primary short list are based upon highest measured long and short term interference levels, respectively, for each of the plurality of communication channels across each beam in the set of beams.

21 Claims, 4 Drawing Sheets

DYNAMIC CHANNEL ASSIGNMENT FOR INTELLIGENT ANTENNAS

FIELD OF THE INVENTION

The present invention relates generally to wireless communication systems and, in particular, to channel assignment schemes.

BACKGROUND OF THE RELATED ART

Call quality and capacity are important concerns in wireless communication systems. Carrier signal to interference (C/I) ratio is a primary factor in determining call quality and capacity. Specifically, the higher the C/I ratio, the better the call quality and the higher the capacity. By contrast, the lower the C/I ratio, the poorer the call quality while potentially adversely affecting capacity. Several schemes exist for improving the C/I ratio. Two such schemes involve dynamic channel assignment (DCA) techniques and fixed multi-beam intelligent antenna (FMBIA) systems.

The first scheme, i e., DCA, is a flexible channel allocation technique for dynamically assigning communication channels to mobile-stations based on interference level measurements. Generally, communication channels having low or lower associated interference level measurements are assigned to mobile-stations before communication channels having high or higher associated interference level measurements. This scheme improves the chances that communication channel assigned to mobile-stations will have a high or acceptable C/I ratio.

A DCA technique in accordance with the prior art utilizes long term interference level measurements and short term or near real-time interference level measurements to dynamically assign communication channels. The DCA technique includes a channel segregation procedure and a dynamic channel assignment procedure, wherein the dynamic channel assignment procedure is based on the results of the channel segregation procedure. The channel segregation procedure involves measuring interference levels for each communication channel not currently active (i.e., idle communication channels) in a given cell or sector. The interference levels are measured using two different processes referred to herein as a long term process and a short term process.

The long term process is used to create a "long list", which is then used by the short term process to create a "short list." The long term process involves measuring interference levels for all idle communication channels over a long term (i.e., every few minutes to few hours). These interference level measurements (also referred to herein as "long term interference level measurements") are used to create the long list, which is a list of the idle communication channels ranked in ascending order from lowest to highest average long term interference level measurements. The top portion of the long list includes the idle communication channels with the lowest average long term interference level measurements, and is referred to herein as "candidate channels" for channel assignment.

The short term process involves measuring interference levels for the candidate channels over a short term or near real-time (i.e., every few seconds to few minutes). These interference level measurements (also referred to herein as "short term interference level measurements") are used to create the short list, which is a list of the candidate channels ranked in ascending order from lowest to highest average short term interference level measurements. Since the short list is updated more frequently than the long list, the interference level measurements of the candidate channels in the short list are more up-to-date than the interference level measurements in the long list resulting in perhaps a different order for the candidate channels (compared to the long list). Accordingly, the short list is used by the dynamic channel assignment procedure to assign candidate channels to mobile-stations.

The dynamic channel assignment procedure involves using short term $C_{est}/I_{short}$ ratios to determine whether a candidate channel is acceptable for assignment, where $C_{est}$ is an estimate of a carrier signal strength based on the mobile-station's uplink signal transmitted during call setup and $I_{short}$ is the measured average short term interference level. Several algorithms may be used to assign candidate channels to a mobile-station. For example, the candidate channel at the top of the short list (i.e., candidate channel with the smallest average interference level) may be the first channel assigned to a mobile-station if it has an acceptable $C_{est}/I_{short}$ ratio, or any candidate channel with an acceptable $C_{est}/I_{short}$ ratio may be assigned to the mobile-station. Therefore, DCA improves the chances that idle communication channels assigned to mobile-stations will have a high or acceptable C/I ratio.

The second scheme for improving the C/I ratio, i.e., FMBIA systems, involves using multiple narrow beam coverage in order to reduce co-channel interference to active communication channels. FIG. 5 depicts a geographical area or cell 10 associated with base station 14 for providing wireless communication services to mobile-stations within cell 10, wherein base station 14 has incorporated a FMBIA system in accordance with the prior art. Cell 10 is divided into a plurality of 120° sectors 12-j, wherein each sector is further divided into four 30° sub-sectors.

FIG. 6 depicts a schematic of a generic fixed multi-beam intelligent antenna system 20 for a time division multiple access (TDMA) based wireless communication system in accordance with the prior art, wherein communication channels are defined by a frequency and a time slot. FMBIA system 20 comprises an antenna array 22, low noise amplifiers 24, RF switch matrix 26, radios 28 and intelligent antenna controller (IAC) 29 (implementable in a digital signal processor). Antenna array 22 produces twelve 30° beams for providing wireless communication coverage to the sub-sectors of cell 10. The 30° beams are channeled to radios 28 via low noise amplifiers 24 and RF switch matrix 26. Radios 28 are assigned to process (e.g., modulate and demodulate) signals on active communication channels, and are equipped with beam scan receivers for sequentially sampling and measuring received-signal strengths (RSS) of the twelve beams for each time slot in each frequency channel. Each RSS is mapped to a RSS indicator (RSSI) value using a RSS-RSSI conversion or look-up table, wherein higher RSSI indicates higher signal levels for active communication channels. The RSSI are provided to IAC 29, which uses the RSSI to select an optimal beam or beams (i.e., beam with highest RSSI moving average) for each active communication channel. Upon selecting the optimal beam or beams, IAC 29 directs RF switch matrix 26 to channel the optimal beam or beams to the appropriate radios 28 assigned to process signals for the corresponding active communication channels. Thus, FMBIA systems improve the C/I ratio on active communication channels at mobile-stations by directing optimal beams to the mobile-station.

The C/I ratio in FMBIA systems can be further improved through the use of dynamic channel assignment techniques adapted for FMBIA systems. Accordingly, there exists a need for a dynamic channel assignment scheme adapted for FMBIA systems.

SUMMARY OF THE INVENTION

The present invention is a method for improving call quality and capacity by integrating a dynamic channel allocation technique into intelligent antenna systems. Channels are dynamically assigned to a mobile-station by measuring interference levels on each beam in a set of beams for a plurality of communication channels, and assigning to the mobile-station a communication channel from the plurality of communication channels based on the measured interference levels on each beam in the set of beams.

In one embodiment, the present invention measures long term interference levels on each beam in a set of beams for a plurality of communication channels, measures short term interference levels on each beam in the set of beams for a portion of the plurality of communication channels, and assigns to a mobile-station a communication channel from the portion of the plurality of communication channels based on the measured short term interference levels on each beam in the set of beams.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention is a method for improving call quality and capacity by integrating a dynamic channel allocation technique into intelligent antenna systems. Channels are dynamically assigned to a mobile-station by measuring interference levels on each beam in a set of beams for a plurality of communication channels, and assigning to the mobile-station a communication channel from the plurality of communication channels based on the measured interference levels on each beam in the set of beams.

The present invention is described herein with respect to a wireless communication system based on time division multiple access (TDMA) techniques, wherein a communication channel is defined by a frequency channel and a time slot. This should not, however, be construed to limit the present invention in any manner. It should be understood that the present invention is applicable to wireless communication systems based on other multiple access techniques, such as frequency division multiple access(FDMA).

Figure 1:
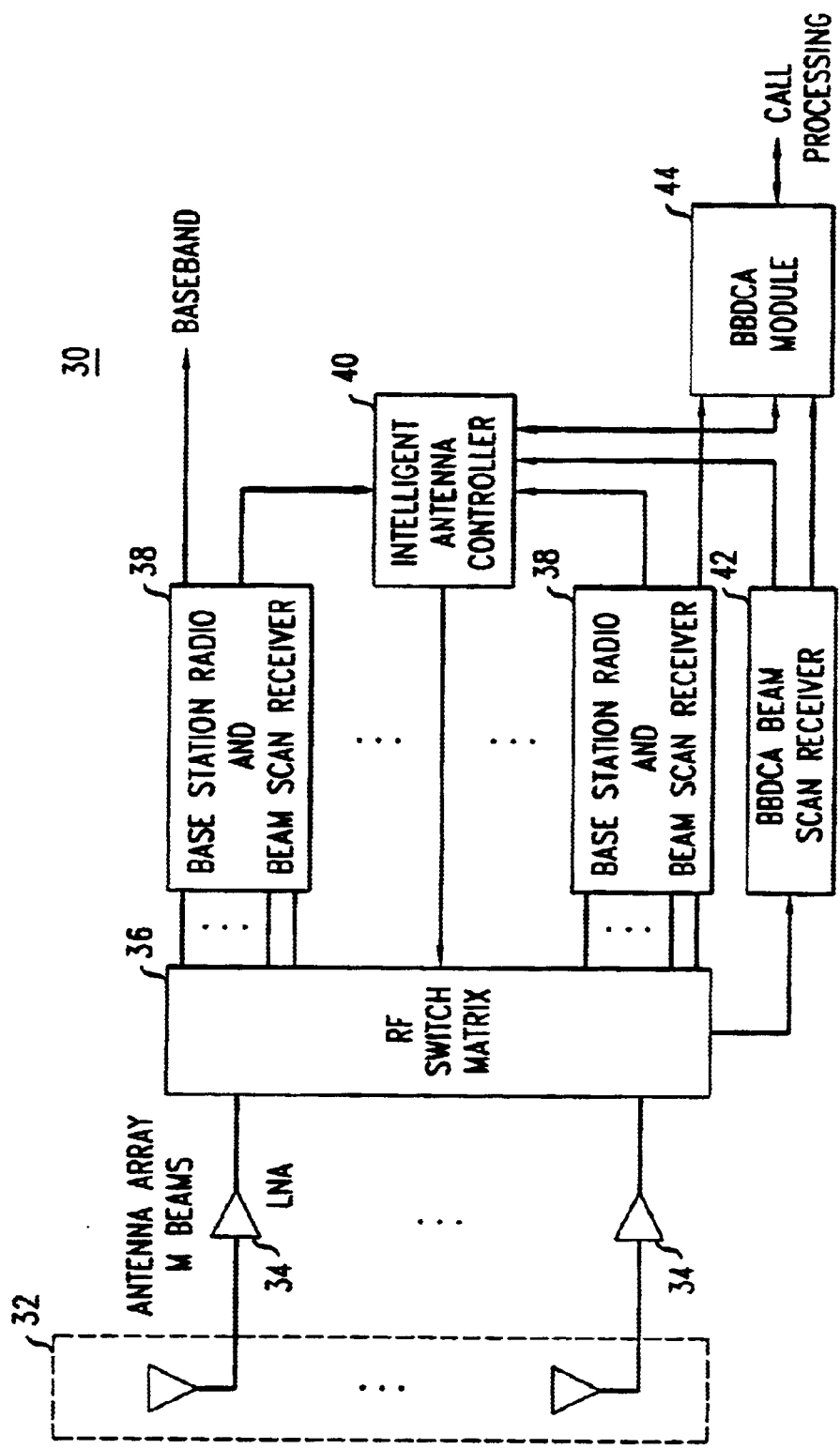
FIG. 1 depicts a schematic of a fixed multi-beam intelligent antenna system incorporated with a beam based dynamic channel assignment scheme in accordance with the present invention.

FIG. 1 depicts a schematic of a fixed multi-beam intelligent antenna (FMBIA) system 30 incorporated with a beam based dynamic channel assignment (BBDCA) scheme in accordance with the present invention. FMBIA system 30 comprises antenna array 32, low noise amplifiers 34, RF switch matrix 36, radios 38, intelligent antenna controller (IAC) 40, BBDCA beam scan receiver 42 and BBDCA module 44. Antenna array 32 produces M beams for providing wireless communication coverage to a cell, wherein the M beams are grouped into beam sets S. Each beam set S includes $N_s$ beams, where $1 \leq N_s \leq M$. Note that it is possible for a beam to be in one or more sets S, and a set S may include beams that provide coverage to a same sector or to different sectors. In one embodiment, a set S of beams provides coverage to an entire sector. For example, an 120° sector may use four 30° beams for providing wireless communication coverage to mobile-stations within the sector. Such four 30° beams collectively comprises the beam set S for a sector. The manner in which beams are grouped into sets S depends, in one embodiment, on factors such as application, mobility of the mobile-station, coverage requirements, capacity requirements and/or optimization considerations.

The M beams are directed from antenna array 32 to radios 38 and BBDCA beam scan receiver 42 via low noise amplifiers 34 and RF switch matrix 36. Radios 38 are equipped with beam scan receivers for sequentially sampling and measuring received signal strengths (RSS) of the M-beams for all or some active and/or idle communication channels. Each RSS is mapped to a RSS indicator (RSSI) value using a RSS-RSSI conversion or look-up table, wherein higher RSSI indicates lower interference on active communication channels but higher interference on idle communication channels. The RSSI for each communication channel on each beam are provided to IAC 40, which uses the RSSI to select an optimal beam or beams (i.e., highest RSSI moving average) for each active communication channel. IAC 40 subsequently uses RF switch matrix 36 to channel the optimal beam or beams to the appropriate radios 38 assigned to process signals transmitted over the corresponding active communication channels.

BBDCA beam scan receiver 42 sequentially samples and measures RSS for communication channels on beams switched to BBDCA beam scan receiver 42 by IAC 40 via RF switch 36. The particular communication channels directed to BBDCA beam scan receiver 42 by IAC 40 are determined by BBDCA module 44. In one embodiment, BBDCA module 44 directs IAC 40 to have RF switch matrix 36 route all or some idle communication channels to BBDCA beam scan receiver 42. The measured RSS are converted to RSSI by BBDCA beam scan receiver 42 and provided as input to BBDCA module 44 wherein, as mentioned earlier, higher RSSI indicates greater interference on idle communication channels. Note that for TDMA, RSS (or RSSI) measurements may be performed on either a frame or time slot basis.

BBDCA module 44 receives RSSI input from IAC 40 and/or BBDCA beam scan receiver 42, and uses such input to create a plurality of lists. Specifically, BBDCA module 42 uses a long term process to generate a long list, and a short term process to generate a primary short list and a plurality of secondary short lists based on the long list. The long list is a list of idle communication channels ranked in ascending order from lowest to highest long term RSSI moving average, wherein a long term RSSI is a RSSI that is measured over a long time interval, such as a few minutes or hours. The idle communication channels included in the long list may comprise the entire spectrum associated with the wireless communication systems or a limited portion of the spectrum as, for example, determined by a service provider or system operator. A long list is generated and maintained for each beam set S. In another embodiment, the long list may be a list indicating long term RSSI or RSS values, wherein the RSSI or RSS values may or may not be moving averages. In yet another embodiment, the long list may or may not include the interference level measurements, and the idle communication channels are not ranked according to RSSI or RSS values or may be ranked according to some other parameter.

Figure 2:
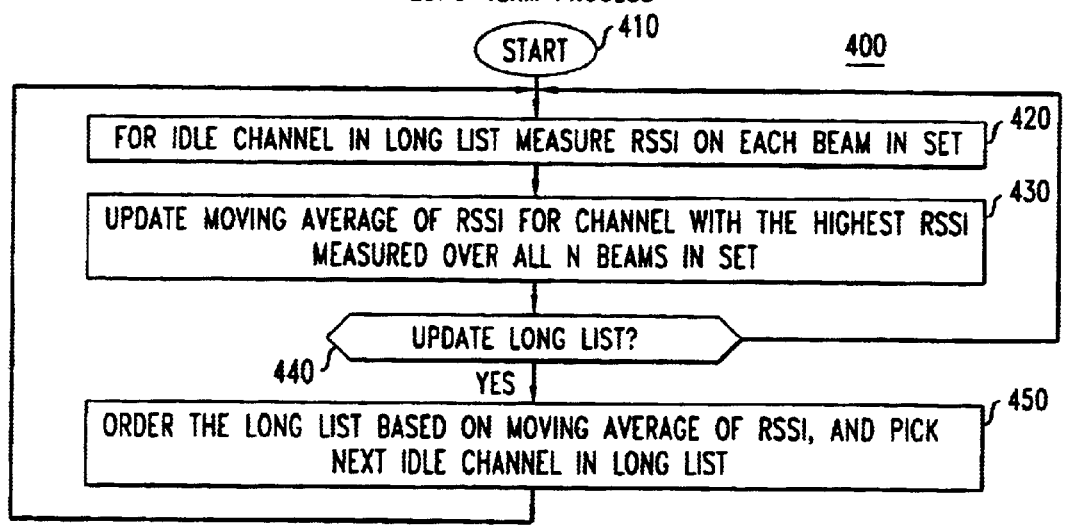
FIG. 2 is a flowchart illustrating a long term process in accordance with the present invention.

FIG. 2 is a flowchart 400 illustrating a long term process in accordance with the present invention. The long term process begins in step 410. In step 420, the RSS is measured for an idle communication channel on each beam in set S. Specifically, BBDCA module 44 directs IAC 40 to have BBDCA beam scan receiver 42 measure the RSS for the idle communication channel. Since there are $N_s$ number of beams in set S, there will be $N_s$ number of RSS measurements made by BBDCA beam scan receiver 42 for the idle communication channel. In step 430, the highest RSS measurement for the idle communication channel over all $N_s$ beams in beam set S is used to update a long term RSSI moving average for the current idle communication channel.

For example, suppose communication channel CH is the current idle communication channel, set S comprises four beams, and the RSS measurements for communication channel CH on all four beams in set S are RSS-CH(beam 1), RSS-CH(beam 2), RSS-CH(beam 3) and RSS-CH(beam 4). If RSS-CH(beam 2) is the highest of the four RSS measurements, then RSS-CH(beam 2) is converted to an RSSI value and used to update the long term RSSI moving average for communication channel CH. If the long term RSSI moving average for communication channel CH corresponds to the average of three previous highest RSS measurements, the oldest previous highest RSS measurement is replaced by the current highest RSS measurement, i.e., RSSI-CH(beam 2), to obtain an updated long term RSSI moving average for current communication channel CH.

In step 440, the long term process determines if the long list has to be updated and/or re-ordered. In one embodiment, it is determined that the long list has to be updated and/or re-ordered if the updated long term RSSI moving average is different from the previous long term RSSI moving average for the current idle communication channel. If the long list does not have to be updated, the long term process returns to step 420 and measures the RSS for another or next idle communication channel.

If the long list has to be updated, the long term process proceeds to step 450 and updates and/or re-orders the long list based on the updated long term RSSI moving average for the current idle communication channel. Specifically, the long list is updated or re-ordered by ranking the idle communication channels in ascending order from lowest to highest long term RSSI moving average. Upon completion of the updating and/or re-ordering, the long term process selects another or next idle communication in long list and proceeds to step 420 where the RSSI is measured for the other or next idle communication channel on each beam in set S.

Figure 3:
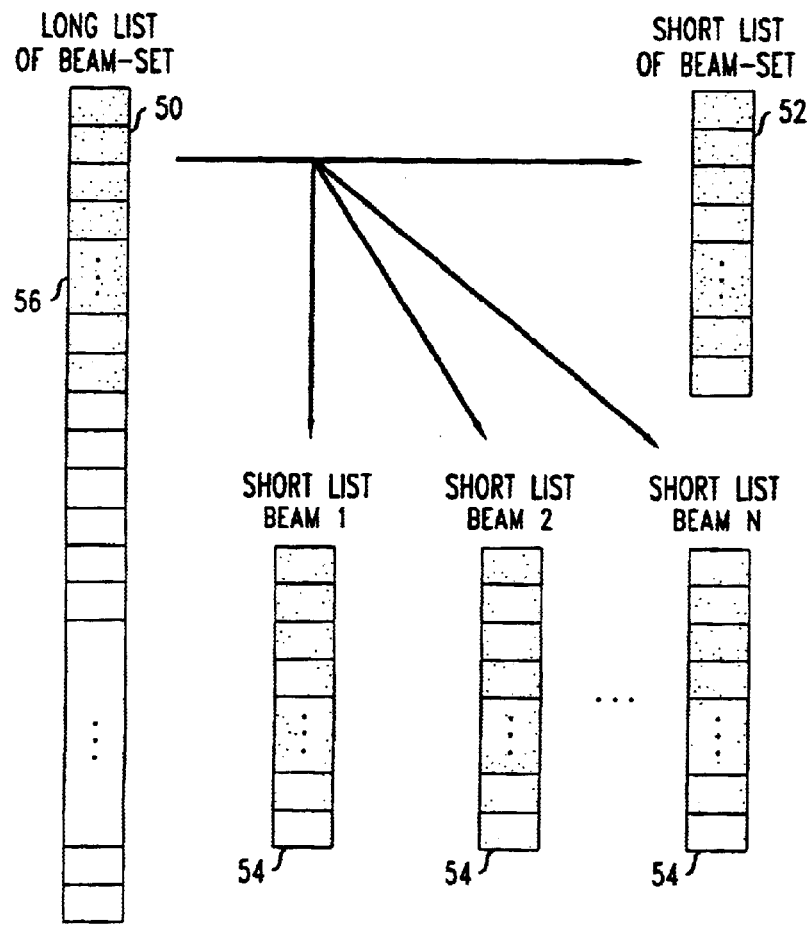
FIG. 3 depicts the relationship among a long list, a primary short list and a plurality of secondary short lists.
Figure 4:
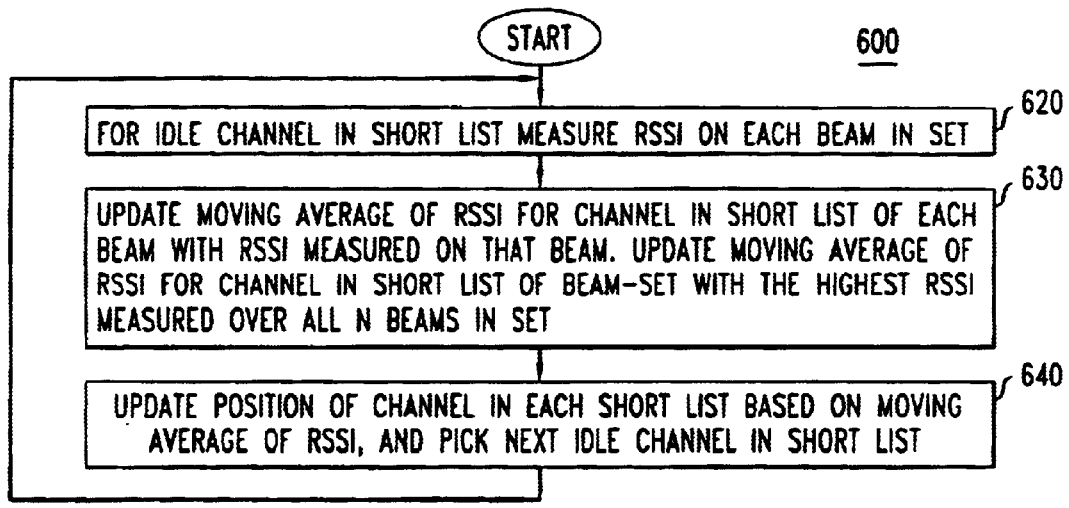
FIG. 4 is a flowchart illustrating a short term process in accordance with the present invention.
Figure 5:
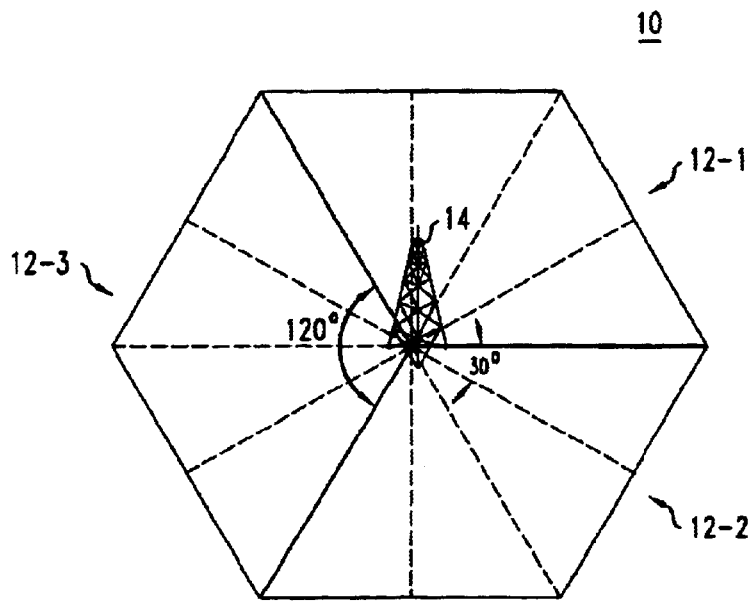
FIG. 5 depicts a cell associated with a base station having a fixed multi-beam intelligent antenna for providing wireless communication services to mobile-stations within the cell in accordance with the prior art.
Figure 6:
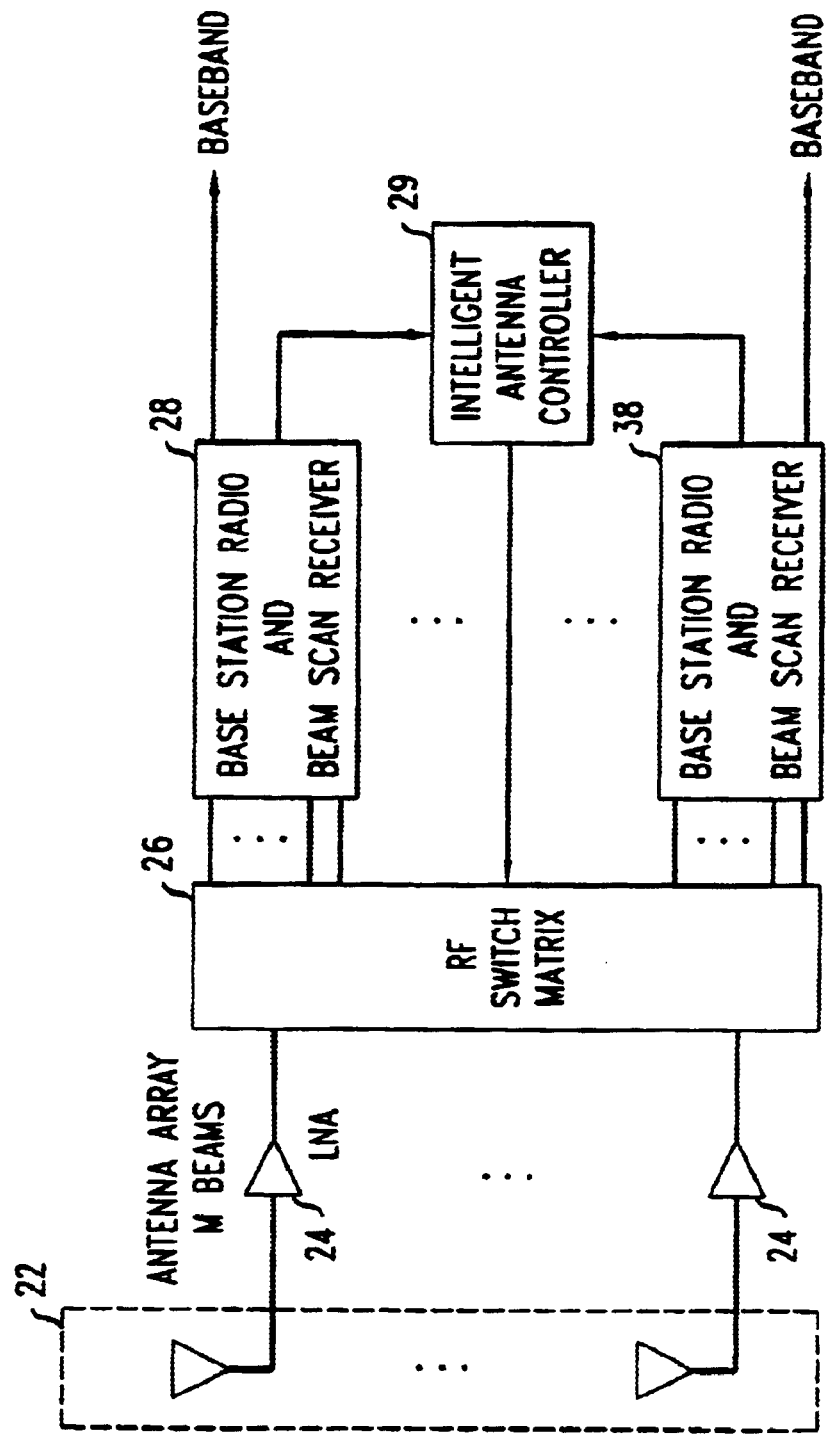
FIG. 6 depicts a schematic of a generic fixed multi-beam intelligent antenna system for a time division multiple access based wireless communication system in accordance with the prior art.

The top portion of the long list includes the idle communication channels with the highest long term RSSI moving average, and is referred to herein as "candidate channels" for channel assignment. The number of candidate channels is a system parameter that may be set, for example, by the service provider or system operator. The candidate channels are used by the short term process to create the primary and secondary short lists. See FIG. 3, which depicts the relationship among a long list 50, a primary short list 52 and a plurality of secondary short lists. 54, wherein the top (shaded) portion 56 of the long list represents the candidate channels. The primary and secondary short lists are lists of the candidate channels ranked in ascending order from lowest to highest short term RSSI moving average, wherein a short term RSSI corresponds to a RSS measured over a short time interval, e.g., a few seconds to a few minutes. Generally, the short term RSSI corresponds to a RSS measured over a shorter time interval than a long term RSSI. The primary and secondary short list differ in that the latter is associated with individual beams, whereas the former is associated with beam sets S. Specifically, each secondary short list includes the candidate channels ranked in ascending order from lowest to highest short term RSSI moving average as measured for the beam to which the secondary short list is associated. By contrast, the primary short list includes the candidate channels ranked in ascending order from lowest to highest short term RSSI moving average based on the highest RSS measured over all $N_s$ beams in set S. In another embodiment, the primary and secondary short lists may be lists indicating short term RSSI or RSS values, wherein the RSSI or RSS values may or may not be moving averages. In yet another embodiment, the primary and secondary short lists may or may not include the interference level measurements, and the idle communication channels are not ranked according to RSSI or RSS values or may be ranked according to some other parameter FIG. 4 is a flowchart 600 illustrating a short term process in accordance with the present invention. The short term process begins in step 610. In step 620, the short term process measures the RSS for a candidate channel on each beam in set S. The measured RSS is used to update short term RSSI moving averages on both the primary short list and the secondary short lists, in step 630. Specifically, for each beam, a short term RSSI moving average for the candidate channel is updated for the associated secondary short list. For the beam set, the highest short term RSSI moving average for the current candidate channel over all $N_s$ beams in beam set S is used to update a short term RSSI moving average for the same candidate channel in the primary short list. Alternately, the highest, the highest short term RSSI value (not moving average) for the current candidate channel over all Ns beams in beam set S is used to update the short term RSSI moving average for the candidate channel in the primary short list.

In step 640, the short term process updates and/or re-orders the primary and secondary lists based on the updated short term RSSI moving averages for the current candidate channel. Upon completion of the updating and/or re-ordering, the short term process selects another or next candidate and proceeds to step 620 where the RSS is measured for the other or next candidate channel on each beam in set S.

The long and short term processes are different in several respects. Specifically, the long term and short term processes have different associated measurement rates at which RSS are measured, averaging time windows and averaging weights, wherein averaging time window is a duration over which sample average is maintained and averaging weight is a weighing factor associated with each sample. The measurement rate, averaging time window and averaging weight for the long term process are set such that the long list reflect slowly varying (long term) system characteristics, such as terrain features, system deployment, system growth and fixed spectrum. By contrast, the measurement rate, averaging time window and averaging weight for the short term process are set such that the short list reflect rapidly varying (short term) system characteristics such as traffic, radio link, interference and shadow fading. Accordingly, the measurement rate for communication channels in the short list is faster than that for communication channels in the long list, and the averaging time window for the short list is much shorter than that for the long list. The averaging time window or weights are optimized for each list based on performance factors, such as blocking rate and dropping rate. For example, if blocking or dropping rate increases, then the averaging process is shortened.

Channel assignment can be made from the primary short list, secondary short list or both short lists depending on factors such as call quality and handoffs. For example, if higher carrier to interference quality is most important, the secondary short list is used to assign channels to mobile-stations because the secondary short list would indicate the best idle communication channel in the associated sub-sector. If reducing the number of handoffs is most important, the primary short list is used to assign channels because the primary short list would indicate the best idle communication channel across all sub-sectors belonging to the associated set. If carrier to interference and handoffs are to be considered, channels can be assigned through an interpolation of the primary and secondary short lists. For example, the measured RSS (or RSSI) in the short lists can be combined, such as added, averaged, multiplied, etc., to produce an interpolated RSS (or RSSI) value, which can be used to generate an interpolated short list.

Communication channels are assigned upon call initiation. When a new call is initiated, the mobile-station transmits over a control channel either a page response or a mobile origination message. The beam that covers the mobile-station (i.e., coverage beam) is detected through this transmission over the control channel. Information regarding which beam covers the mobile-station is sent to BBDCA module 44, which uses such information to select the best candidate channels (e.g., candidate channels with highest short term RSSI moving average or acceptable C/I ratio) from the primary short list corresponding to the beam set S which includes the coverage beam and/or from the secondary short list corresponding to the coverage beam.

As mentioned earlier, in one embodiment, the manner in beams are grouped into sets S depending on the application, mobility of the mobile-stations, coverage requirements, capacity requirements and/or optimization considerations. In fixed applications, the mobility is so low that the typical mobile-station remains with the coverage area of a beam for the entire duration of a call. For this application, it may be advantageous in terms of capacity to make each beam a set S by itself, and maintain a long list and a primary short list for each beam in a sector. Note that in this scenario, the primary and secondary short list are the same because call quality is more important than reducing the number of handoffs.

In low mobility applications, the typical mobile-station stays within the coverage of a limited number of beams (less than the total number of beams in a sector) during a life of a call. For such applications, it may be advantageous to group adjacent beams into sets S. The number of sets in a sector and beams per set is optimized for the specific coverage needs of the application. A long list and a primary short list are maintained for each set S, wherein the primary short list for each set is derived from a small set of secondary short lists In high mobility applications, the typical mobile-station crosses many or all beams in a sector during the duration of a call. For this application, the sets S may comprise of every beam in the sector. A long list and a primary short list are maintained for each set S or sector. Note that in practical deployment scenarios, mixtures of the three aforementioned applications would be typical for a wireless communication system.

Although the present invention has been described in considerable detail with reference to certain embodiments, other versions are possible. For example, secondary long lists may be generated for every beam and used to create a primary long list in a manner similar to which the primary short list is created from the secondary short lists. Therefore, the spirit and scope of the present invention should not be limited to the description of the embodiments contained herein.

We claim:

1. A method of channel assignment for a wireless communications system incorporating a fixed multi-beam intelligent antenna system comprising the steps of:
   measuring interference levels on each beam in a set of beams for a plurality of idle communication channels; and
   assigning to a mobile-station a communication channel from the plurality of idle communication channels based on the measured interference levels on each beam in the set of beams.

2. The method of claim 1, wherein highest measured interference levels for each of the plurality of communication channels across each beam in the set of beams is used to assign the communication channel.

3. The method of claim 1, wherein the plurality of communication channels are idle communication channels in the coverage area associated with the set of beams.

4. The method of claim 1, wherein the step of measuring interference levels is repeated over short terms.

5. A method of channel assignment for a wireless communications system incorporating a fixed multi-beam intelligent antenna system comprising the steps of:
   measuring interference levels on each beam in a set of beams for a plurality of communication channels, wherein the step of measuring interference levels is repeated over short terms; and
   assigning to a mobile-station a communication channel from the plurality of communication channels based on the measured interference levels on each beam in the set of beams, wherein the step of assigning the communication channel comprises the additional step of generating a plurality of secondary short lists for each beam using the measured short term interference levels associated with each beam.

6. The method of claim 5, wherein each of the plurality of secondary short lists include communication channels ranked according to the measured short term interference levels.

7. The method of claim 5, wherein the communication channel is assigned using a secondary short list corresponding to a coverage beam.

8. A method of channel assignment for a wireless communications system incorporating a fixed multi-beam intelligent antenna system comprising the steps of:
   measuring interference levels on each beam in a set of beams for a plurality of communication channels, wherein the step of measuring interference levels is repeated over short terms; and assigning to a mobile-station a communication channel from the plurality of communication channels based on the measured interference levels on each beam in the set of beams, wherein the step of assigning the communication channel comprises the additional step of generating a primary short list for the set of beams using the measured short term interference levels, wherein the primary short list is based upon highest or average measured short term interference levels for each of the plurality of communication channels across each beam in the set of beams.

9. The method of claim 8, wherein the primary short list includes communication channels ranked according to the highest measured short term interference levels for each of the plurality of communication channels across each beam in the set of beams.

10. The method of claim 8, wherein the communication channel is assigned using the primary short list.

11. The method of claim 8, wherein the step of assigning the communication channel comprises the additional step of:

generating a plurality of secondary short lists for each beam using the measured short term interference levels.

12. The method of claim 11, wherein the communication channel is assigned using the primary short list and a secondary short list corresponding to a coverage beam.

13. A method of channel assignment for a wireless communications system incorporating a fixed multi-beam intelligent antenna system comprising the steps of:

measuring interference levels on each beam in a set of beams for a plurality of communication channels over long terms;

measuring interference levels on each beam in the set of beams for a portion of the plurality of communication channels over short terms; and assigning to a mobile-station a communication channel from the portion of the plurality of communication channels based on the measured short term interference levels on each beam in the set of beams.

14. The method of claim 13, wherein highest or average measured short term interference levels for each of the plurality of communication channels across each beam in the set of beams is used to assign the communication channel.

15. The method of claim 13, wherein the portion of the plurality of communication channels include communication channels with lower measured long term interference levels relative to long term interference levels measured for other communication channels belonging to the plurality of communication channels.

16. The method of claim of claim 13, wherein the step of assigning the communication channel comprises the additional step of:

generating a plurality of secondary short lists for each beam using the measured short term interference levels.

17. The method of claim 16, wherein the communication channel is assigned using a secondary short list corresponding to a coverage beam.

18. The method of claim 13, wherein the step of assigning the communication channel comprises the additional step of:

generating a primary short list for the set of beams using the measured short term interference levels, wherein the primary short list is based upon highest measured short term interference levels for each of the plurality of communication channels across each beam in the set of beams.

19. The method of claim 18, wherein the communication channel is assigned using the primary short list.

20. The method of claim 18, wherein the step of assigning the communication channel comprises the additional step of:

generating a plurality of secondary short lists for each beam using the measured short term interference levels.

21. The method of claim 20, wherein the communication channel is assigned using the primary short and a secondary short list corresponding to a coverage beam.

* * * * *